US009577250B2

(12) United States Patent
Xiao et al.

(10) Patent No.: US 9,577,250 B2
(45) Date of Patent: Feb. 21, 2017

(54) THICK ELECTRODES INCLUDING NANOPARTICLES HAVING ELECTROACTIVE MATERIALS AND METHODS OF MAKING SAME

(71) Applicant: BATTELLE MEMORIAL INSTITUTE, Richland, WA (US)

(72) Inventors: Jie Xiao, Richland, WA (US); Dongping Lu, Richland, WA (US); Jun Liu, Richland, WA (US); Jiguang Zhang, Richland, WA (US); Gordon L. Graff, West Richland, WA (US)

(73) Assignee: Battelle Memorial Institute, Richland, WA (US)

( * ) Notice: Subject to any disclaimer, the term of this patent is extended or adjusted under 35 U.S.C. 154(b) by 108 days.

(21) Appl. No.: 14/177,954

(22) Filed: Feb. 11, 2014

(65) Prior Publication Data

US 2015/0228968 A1 Aug. 13, 2015

(51) Int. Cl.
*H01M 4/13* (2010.01)
*H01M 4/36* (2006.01)
(Continued)

(52) U.S. Cl.
CPC .............. *H01M 4/366* (2013.01); *B82Y 30/00* (2013.01); *H01M 4/0471* (2013.01); *H01M 4/139* (2013.01); *H01M 4/362* (2013.01); *H01M 4/386* (2013.01); *H01M 4/485* (2013.01); *H01M 4/581* (2013.01); *H01M 4/587* (2013.01); *H01M 4/5825* (2013.01); *H01M 4/625* (2013.01); *C01B 31/02* (2013.01); *H01M 4/0404* (2013.01);
(Continued)

(58) Field of Classification Search
CPC ..................... H01M 2004/021; H01M 4/0404; H01M 4/1471; H01M 4/366; H01M 4/38; H01M 4/48; H01M 4/5825; H01M 4/622; H01M 4/625; H01M 4/66
See application file for complete search history.

(56) References Cited

U.S. PATENT DOCUMENTS

| | | | |
|---|---|---|---|
| 2008/0237536 A1 | 10/2008 | Sano | |
| 2010/0261063 A1* | 10/2010 | Kitagawa | ................ C01B 25/37 429/232 |

(Continued)

FOREIGN PATENT DOCUMENTS

| | | |
|---|---|---|
| KR | 10-2013-0118243 | 10/2013 |
| WO | WO 04-001881 | 12/2003 |

OTHER PUBLICATIONS

International Search Report and Written Opinion from International Application No. PCT/US2015/013704, dated Apr. 30, 2015 (13 pages).

(Continued)

*Primary Examiner* — Patrick Ryan
*Assistant Examiner* — Ben Lewis
(74) *Attorney, Agent, or Firm* — Klarquist Sparkman, LLP

(57) ABSTRACT

Electrodes having nanostructure and/or utilizing nanoparticles of active materials and having high mass loadings of the active materials can be made to be physically robust and free of cracks and pinholes. The electrodes include nanoparticles having electroactive material, which nanoparticles are aggregated with carbon into larger secondary particles. The secondary particles can be bound with a binder to form the electrode.

30 Claims, 13 Drawing Sheets

(51) Int. Cl.

| | |
|---|---|
| *H01M 4/62* | (2006.01) |
| *H01M 4/04* | (2006.01) |
| *H01M 4/58* | (2010.01) |
| *B82Y 30/00* | (2011.01) |
| *H01M 4/139* | (2010.01) |
| *H01M 4/38* | (2006.01) |
| *H01M 4/485* | (2010.01) |
| *H01M 4/587* | (2010.01) |
| *H01M 4/02* | (2006.01) |
| *H01M 4/1393* | (2010.01) |
| *H01M 4/1395* | (2010.01) |
| *H01M 4/1397* | (2010.01) |
| *C01B 31/02* | (2006.01) |

(52) U.S. Cl.
CPC ........ *H01M 4/1393* (2013.01); *H01M 4/1395* (2013.01); *H01M 4/1397* (2013.01); *H01M 4/5815* (2013.01); *H01M 4/621* (2013.01); *H01M 2004/021* (2013.01); *Y02E 60/122* (2013.01)

(56) References Cited

U.S. PATENT DOCUMENTS

| | | | | |
|---|---|---|---|---|
| 2011/0003207 A1* | 1/2011 | Oh | ............... | H01M 4/0404 429/231.8 |
| 2011/0008531 A1* | 1/2011 | Mikhaylik | ............... | H01M 4/04 427/77 |
| 2011/0012067 A1* | 1/2011 | Kay | ............... | C01B 25/375 252/507 |
| 2011/0159364 A1* | 6/2011 | Nishinaka | ............ | H01M 4/621 429/217 |
| 2011/0294007 A1* | 12/2011 | Hosaka | ............... | H01M 4/667 429/210 |
| 2012/0244425 A1* | 9/2012 | Tokuda | ............ | H01M 4/5825 429/199 |
| 2013/0248773 A1* | 9/2013 | Chang | ............... | H01M 4/5825 252/506 |

OTHER PUBLICATIONS

Bruce et al., "Li-O$_2$ and Li-S batteries with high energy storage," *Nature Materials*, vol. 11, pp. 19-29, Dec. 15, 2011.

Fu et al., "Highly Reversible Lithium/Dissolved Polysulfide Batteries with Carbon Nanotube Electrodes," *Angewandte Chemie International Edition*, 52(27): 6930-6935, May 29, 2013.

Hagen et al., "Lithium-Sulfur Cells: The Gap between the State-of-the-Art and the Requirements for High Energy Battery Cells," *Advanced Energy Materials*, 5(16), Apr. 11, 2015.

Lu et al., "High Energy Density Lithium-Sulfur Batteries: Challenges of Thick Sulfur Cathodes," *Advanced Energy Materials*, 5(16), Mar. 9, 2015.

Zheng et al., "A comprehensive understanding of electrode thickness effects on the electrochemical performances of Li-ion battery cathodes," *Electrochimica Acta*, vol. 71, pp. 258-265, Apr. 6, 2012.

* cited by examiner

THICK ELECTRODES INCLUDING NANOPARTICLES HAVING ELECTROACTIVE MATERIALS AND METHODS OF MAKING SAME

STATEMENT REGARDING FEDERALLY SPONSORED RESEARCH OR DEVELOPMENT

This invention was made with Government support under Contract DE-AC0576RL01830 awarded by the U.S. Department of Energy. The Government has certain rights in the invention.

BACKGROUND

Electrodes having nanostructure and/or utilizing nanoparticles of active materials can exhibit improved performance in energy storage devices compared to traditional electrodes that do not take advantage of nanomaterials. However, one of the challenges is forming a sufficiently large area of uniform active-material nanoparticles with desirable thickness or active mass loading. Only thin electrodes and low active mass loadings have been demonstrated in electrodes having nanoparticles due to the development of cracks and pinholes in electrodes having commercially relevant thicknesses or active mass loadings. For example, in lithium sulfur batteries, the active cathode material, sulfur, is usually loaded in nanosized pores of carbon hosts. This can make improvement of sulfur loading on the electrode difficult while still keeping a large area of uniform coating. Accordingly, a need exists for thick electrodes having nanoparticles of active materials and methods for making the same.

SUMMARY

This document describes electrodes for energy storage devices, wherein the electrodes have a high active mass loading and have nanoparticles comprising an active material. According to embodiments described herein, the nanoparticles are aggregated with conductive carbon into larger secondary particles. The secondary particles are more easily manipulated to form electrodes. For example, a slurry containing the secondary particles can be formed and then casted into electrodes with high, commercially relevant mass loadings. The same has traditionally not been true of slurries made from nanoparticles themselves. This document also describes fabrication methods capable of yielding the secondary particles, such that thick electrodes can be made to uniformly cover large areas without defects such as cracks and pinholes.

In one embodiment, a thick electrode having nanoparticles comprising an electroactive material can be characterized by secondary particles bound together by a binder. In preferred embodiments, but not all, the secondary particles can have an average size greater than or equal to 1 micrometer. Each secondary particle comprises an aggregate of the nanoparticles, wherein the nanoparticles are coated and joined together in each aggregate by conductive carbon and wherein the electrode has a loading of the electroactive material greater than 3 mg/cm$^2$. In some embodiments, the conductive carbon is amorphous.

The nanoparticles can comprise oxide electroactive materials. Other electroactive materials can include, but are not limited to, phosphates, sulfides, sulfates, transition metal oxides, and combinations thereof. Examples can include, but are not limited to, LiFePO$_4$, LiMnPO$_4$, V$_2$O$_5$, and combinations thereof. Alternatively, the nanoparticles can comprise carbon and/or silicon as the electroactive material. In still other embodiments, the nanoparticles can comprise carbon or silicon and an electroactive material can be embedded in the nanoparticles, between the nanoparticles, in the secondary particles, and/or in between secondary particles. One example of an electroactive material that can be embedded is sulfur. In some instances, the sulfur can be loaded in, on, and/or between secondary particles to a composition greater than or equal to 75 wt %. Regardless of the type of electroactive material, in some embodiments, the electroactive material can have a loading in the electrode greater than or equal to 5 mg/cm$^2$. The sulfur content can refer to the weight ratio of embedded sulfur in the sulfur/nanoparticle composite material. The sulfur loading in electrodes, as used herein, can refer to the areal weight of sulfur in the whole electrode, which consists of sulfur/carbon composite, conductor, and binder.

Increased electrode loadings can often be associated with increased electrode thickness for a given electroactive material. In some embodiments, the thick electrodes can have a thickness greater than 60 micrometers. Alternatively, the thickness can be greater than 150 micrometers. In preferred embodiments, the secondary particles can have an average size greater than or equal to 1 micrometer. Examples of suitable binders binding the secondary particles together can include, but are not limited to, carboxymethyl cellulose (CMC), polyvinylidene fluoride (PVDF), styrene butadiene rubber (SBR), or combinations thereof.

Preferably, the thick electrodes are formed on metallic foil current collectors. As described elsewhere herein, such structures are enabled by various aspects of the present invention. Traditional electrodes having nanoparticle electroactive materials formed on foil are not robust. The traditional electrodes often have cracks and pinhole defects. Furthermore, the traditional electrodes can exhibit loose electrode material (e.g., powder, flakes, etc.) that is poorly bound or adhered to the foil and/or electrode.

Another aspect of the present invention includes a method for fabricating the thick electrodes having nanoparticles comprising an electroactive material. The method comprises first dispersing nanoparticles in a volume of liquid to yield a dispersion. One or more reagents can be added to form a mixture that polymerizes and/or forms a gel comprising the nanoparticles. When the mixture is heated, the polymerized or gel material is pyrolyzed to form an aggregate in which nanoparticles are bound together.

In one embodiment, the liquid comprises water. Other suitable liquids can include, for example, organic liquids. A number of suitable reagents exist that can polymerize and/or form a gel incorporating the nanoparticles. For example an organic precursor that attaches to the surface of the nanoparticle before subsequent polymerization is acceptable. If the reagent or organic precursor does not attach to the nanoparticle, then the polymer will form separately instead of aggregating nanoparticles together. The organic precursor preferably comprises carboxylic groups, hydroxyl groups, and combinations thereof. Furthermore, the organic precursors preferably comprise relatively more carbon chains and less hydrogen and oxygen such that the product tends to form carbon instead of CO$_2$ or H$_2$O.

In one example, at least one carboxyl-group-containing organic precursor is added to the dispersion to yield a mixture, which is stirred and heated to a first temperature for a first amount of time. The weight ratio of nanoparticle/organic precursor determines the content of carbon in the product material. One example of a carboxyl-group-containing organic precursor includes, but is not limited to citric acid. Ethylene glycol, long chain polyethylene glycol, or both are then added and heating occurs for a second amount of time. In some embodiments, the mole ratio of carboxyl-group-containing organic precursor to ethylene glycol or polyethylene glycol is around two. The exact ratio can depend on the number of —COOH groups in different carboxylic organic precursors. The heating for a second amount of time initiates an esterification reaction between the carboxylic acid and the ethylene glycol and/or polyethylene glycol to yield an esterification product. The water is evaporated and the esterification product is heated to a second temperature to convert it into a, conductive carbon, thereby forming secondary particles comprising the nanoparticles coated and joined together by the conductive carbon.

The nanoparticles can comprise, for example, carbon or silicon. The nanoparticles can alternatively comprise at least one oxide, phosphate, sulfide, and/or sulfate as an electroactive material. Examples can include, but are not limited to $LiFePO_4$, $LiMnPO_4$, $V_2O_5$, and combinations thereof. Preferably, the electrode has a loading of electroactive material greater than or equal to 3 $mg/cm^2$.

The electroactive material in a preferred embodiment comprises sulfur. The sulfur can be embedded in the secondary particles, in between secondary particles, or both. Preferably, the sulfur loading in the electrode is greater than 5 $mg/cm^2$.

The secondary particles can have a particle size greater than or equal to 1 micrometer. In some embodiments, methods further comprise adding a binder to the secondary particles to yield a slurry. The slurry can then be cast on a substrate or in a form. Preferably, the substrate comprises a metallic foil current collector.

The purpose of the foregoing summary is to enable the United States Patent and Trademark Office and the public generally, especially the scientists, engineers, and practitioners in the art who are not familiar with patent or legal terms or phraseology, to determine quickly from a cursory inspection the nature and essence of the technical disclosure of the application. The summary is neither intended to define the invention of the application, which is measured by the claims, nor is it intended to be limiting as to the scope of the invention in any way.

Various advantages and novel features of the present invention are described herein and will become further readily apparent to those skilled in this art from the following detailed description. In the preceding and following descriptions, the various embodiments, including the preferred embodiments, have been shown and described. Included herein is a description of the best mode contemplated for carrying out the invention. As will be realized, the invention is capable of modification in various respects without departing from the invention. Accordingly, the drawings and description of the preferred embodiments set forth hereafter are to be regarded as illustrative in nature, and not as restrictive.

DESCRIPTION OF DRAWINGS

Embodiments of the invention are described below with reference to the following accompanying drawings.

DETAILED DESCRIPTION

The following description includes the preferred best mode of one embodiment of the present invention. It will be clear from this description of the invention that the invention is not limited to these illustrated embodiments but that the invention also includes a variety of modifications and embodiments thereto. Therefore the present description should be seen as illustrative and not limiting. While the invention is susceptible of various modifications and alternative constructions, it should be understood, that there is no intention to limit the invention to the specific form disclosed, but, on the contrary, the invention is to cover all modifications, alternative constructions, and equivalents falling within the spirit and scope of the invention as defined in the claims.

FIGS. 1-9 show a variety of aspects and embodiments of the present invention. Referring first to FIG. 1A, an illustration depicts a conventional electrode material in which nanoparticles comprising electroactive material are directly bound together with a traditional binder such as a Polyvinylidene Fluoride (PVDF), Styrene Butadiene Copolymer (SBR), and/or Carboxymethyl Cellulose (CMC). In contrast, FIG. 1B depicts secondary particles comprising the nanoparticles aggregated together by conductive carbon. These nanoparticles can be considered to be cross-linked together to form the secondary particles. Traditional binders can then be used to bind secondary particles together.

Figure 1A:
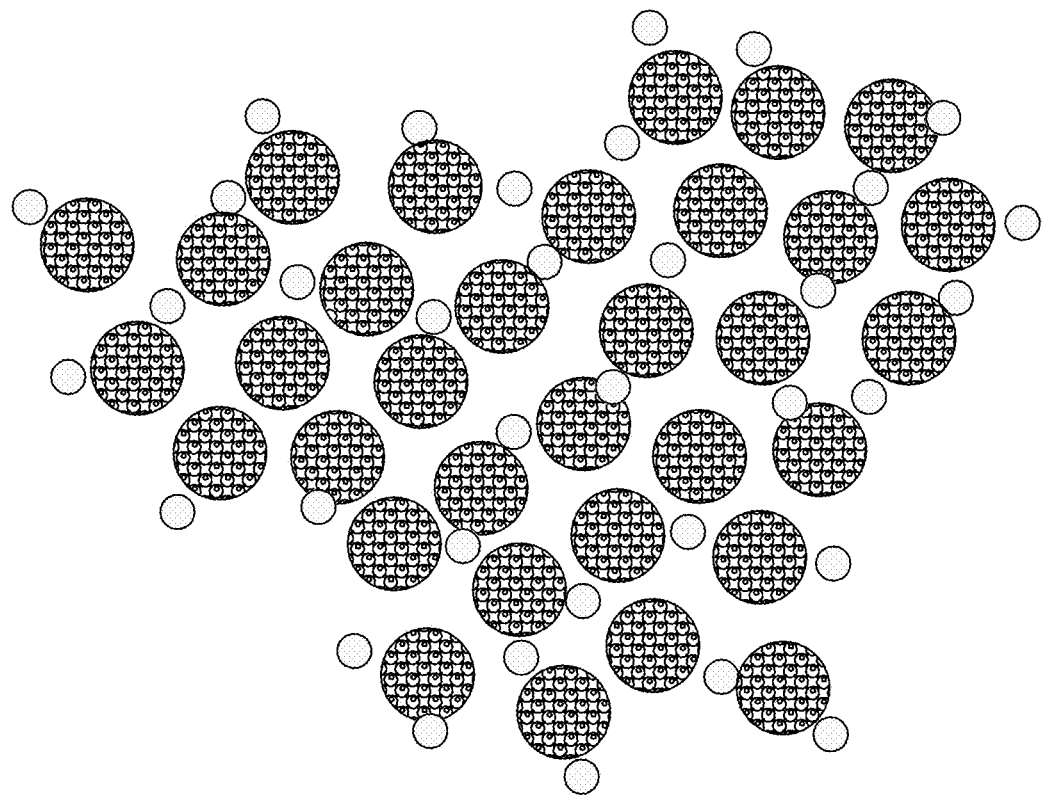
FIG. 1A is an illustration depicting Prior Art in which nanoparticles are directly bound to one another with a binder.
Figure 1A:
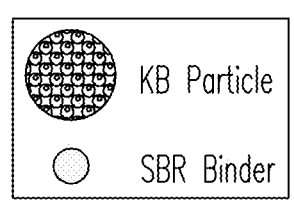
Figure 1B:
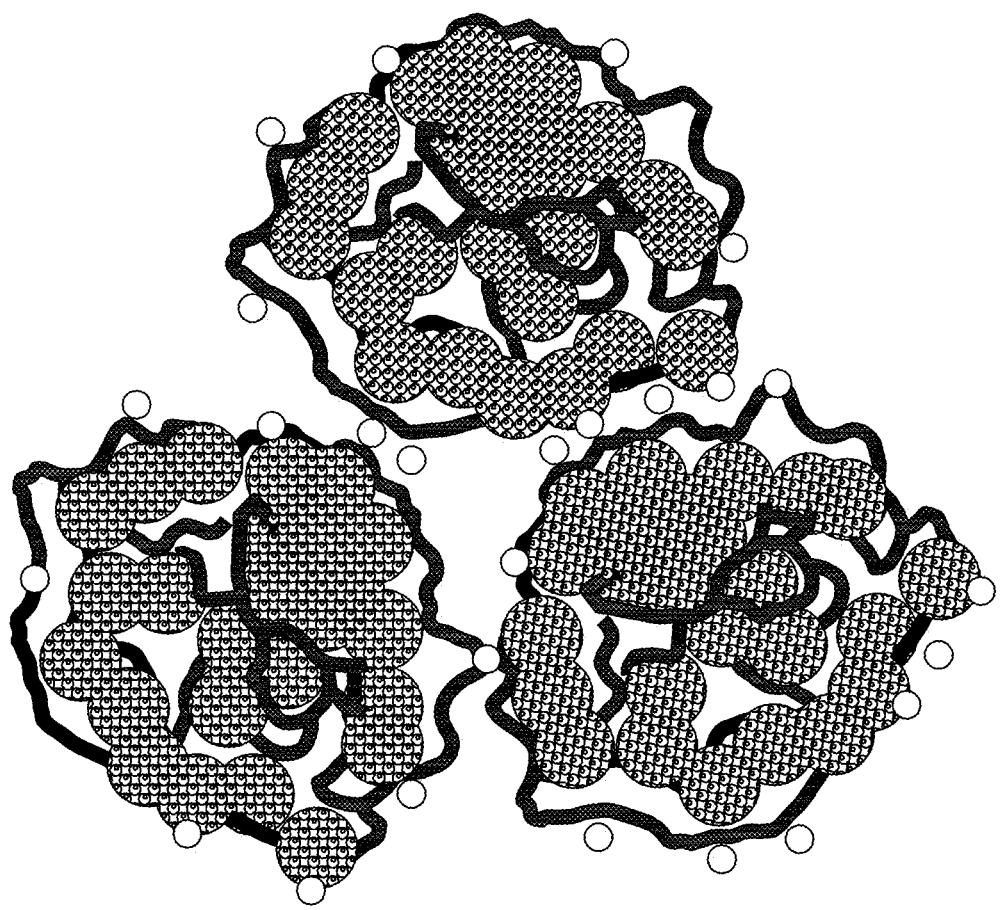
FIG. 1B is an illustration depicting nanoparticles aggregated with carbon into secondary particles, which are bound together with a binder according to embodiments of the present invention.
Figure 1B:
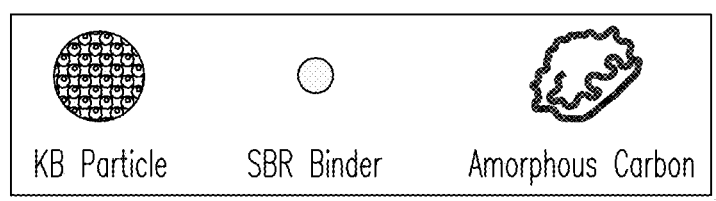

Compared to the material depicted in FIG. 1A, embodiments of the present invention possess some advantages. The relative amount of binder required to form a slurry can be decreased for the larger secondary particles compared to the nanoparticles. Furthermore, the conductive carbon is typically more stable, with less swelling, in the presence of organic electrolytes compared to conductive polymer binders. In addition, conductive carbon can exhibit relatively decreased contact resistance between the primary nanoparticles. Further still, the large secondary particles perform better during slurry preparation when forming electrodes having high mass loading because the carbon can bind and support the nanoparticles without significant volume shrinkage during drying of a casted slurry. Furthermore, for embodiments in which the electroactive material is embedded in and/or adsorbed on porous nanoparticles, the carbon of the secondary particles can help to suppress the diffusion of the electroactive material (and/or reaction products of the electroactive material) during the charge/discharge.

In preferred embodiments, the nanoparticles are uniformly distributed among the conductive carbon to interconnect the nanoparticles well. A least one carboxyl-group-containing organic precursor can be utilized as a partial source for forming the conductive carbon. One example includes, but is not limited to, citric acid, which has —OH and —COOH groups and a long carbon chain. The long carbon chain can help form a carbon framework in each secondary particle. The —OH and —COOH groups can facilitate the interaction and uniform distribution of organic precursor on the surface of the nanoparticles. The nanoparticles and the organic precursor are mixed prior to subsequent polyesterization at increased temperature. In one embodiment, the polyesterization was induced by adding ethylene glycol and/or long-chain polyethylene glycol at 130° C., where the glycol can act as a cross-linking agent and bridge the complex units of the organic precursor together. On heating to a second temperature, the polymerized organic precursor can decompose to form the conductive carbon, which interconnects the nanoparticles during the carbonization process.

Nanoparticles comprising Si or an electroconductive carbon black (i.e., Ketjen Black®) were either fabricated directly into a conventional electrode material according to traditional approaches (as a control sample) or were first aggregated into secondary particles according to embodiments of the present invention, which secondary particles were then formed into an electrode material. The conventional material, used as a control, comprised nanoparticles of Ketjen black (KB) as received.

Figure 2:
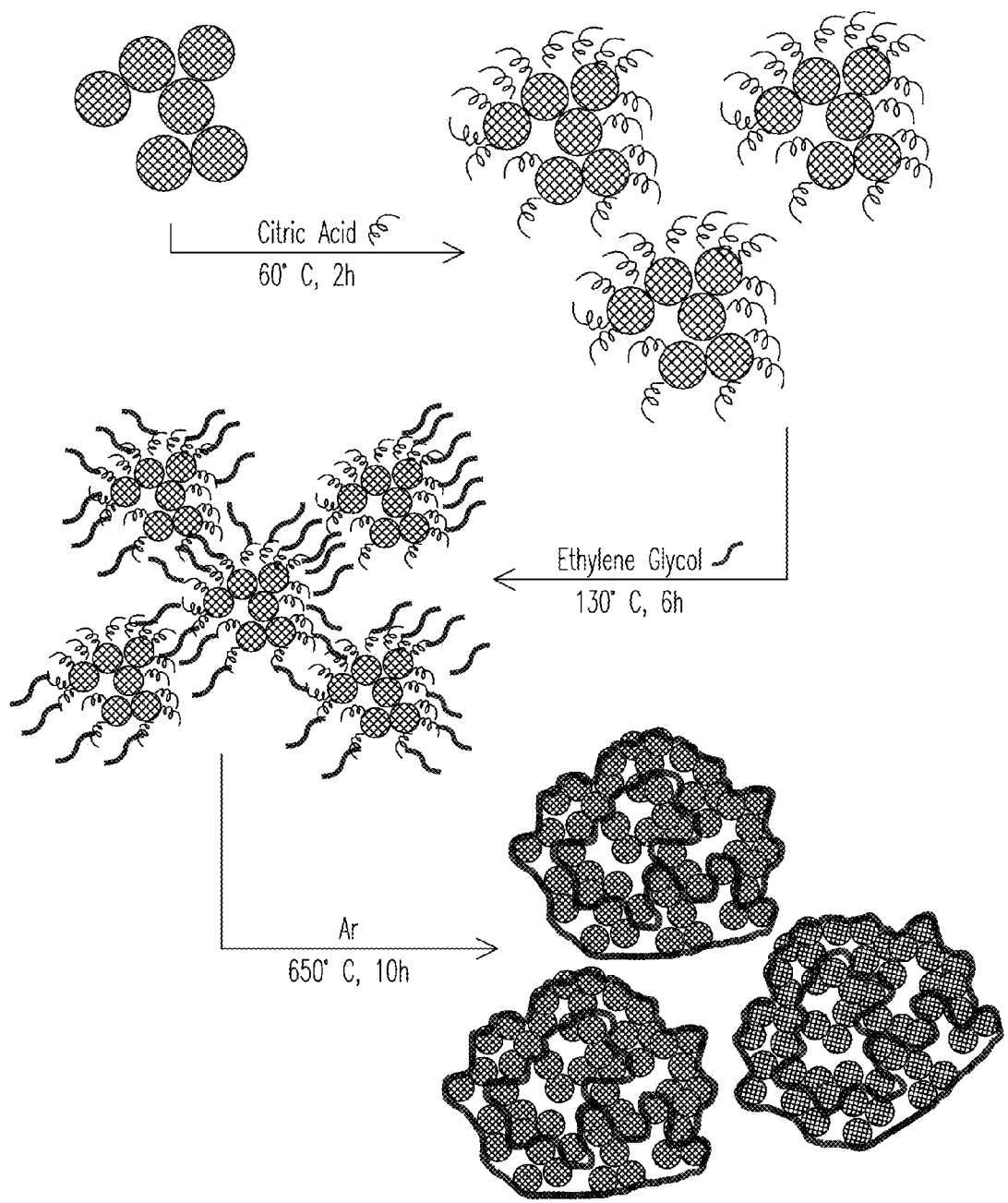
FIG. 2 is an illustration depicting one method for synthesizing secondary particles comprising nanoparticles aggregated with carbon.

The aggregation, according to embodiments of the present invention, of the Si nanoparticles or the Ketjen black nanoparticles into secondary particles was performed via a solution-polymerization approach, which aggregated the nanoparticles into secondary particles having particle sizes on the order of micrometers. FIG. 2 is a schematic flow chart depicting an examples of the synthesis process. In the following examples, 0.5 g Ketjen Black® powder or Si nanoparticles and 0.5 g citric acid were mixed firstly in 30 mL deionized water under vigorous magnetic stirring at 60° C. for 3 h. Then, stoichiometric amounts of ethylene glycol (i.e., 0.32 g ethylene glycol) was added into the solution to react with the citric acid. The ratio of ethylene glycol to citric acid was 2 mol:1 mol. An oil bath temperature was used to increase the temperature to 130° C. for 6 h to cause polymerization, yielding a viscous black esterification product. After drying the esterification product at 80° C. overnight, the obtained solid precursor was calcined in a non-oxidizing Ar atmosphere. According to the present example, a pre-programmed heating process was used to increase the temperature to 400° C. at a rate of 10° C. min$^{-1}$, to maintain the temperature at 400° C. for 5 h to decompose organic groups, to raise the temperature to 650° C. at the same rate, and then to maintain the temperature for 10 h for the formation of cross-linked, or integrated, Ketjen black (IKB) or Si. The IKB comprised secondary particles and differs from the KB control sample, which comprised nanoparticles, but not secondary particles.

An electroactive species, such as sulfur, can be embedded in the secondary particles comprising nanoparticles. In the instant example, sulfur/IKB (S/IKB) composites were prepared by a melt-diffusion approach. Sulfur powder was mixed with synthesized IKB by milling. The mixture was then transferred to a Teflon-lined stainless steel autoclave and heat treated at 155° C. for 12 h to improve the sulfur distribution inside the carbon framework. S/IKB having various sulfur contents of 60% (S60/IKB), 70% (S70/IKB) and 80% (S80/IKB) sulfur were produced. As a control sample, sulfur was also embedded in the traditional Ketjen black nanoparticle material (KB) to form a material having 80% sulfur (S80/KB) according to the melt-diffusion approach described above.

Figure 3A:
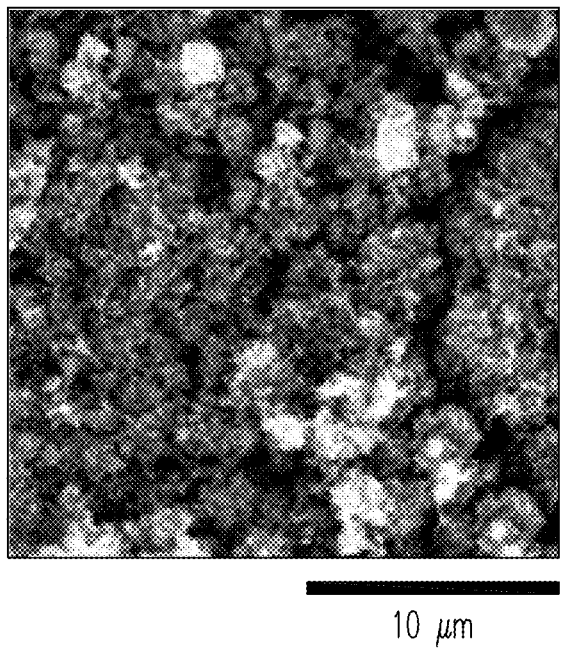
FIGS. 3A-3F contain SEM images of samples of (A) KB, (B) S80/KB, (C) magnification of FIG. 3B, (D) IKB, (E) S80/IKB, and (F) magnification of FIG. 3E.
Figure 3B:
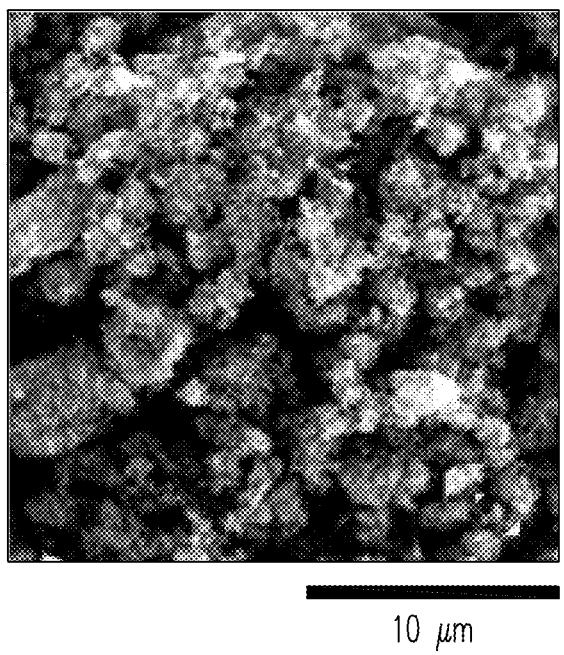
Figure 3C:
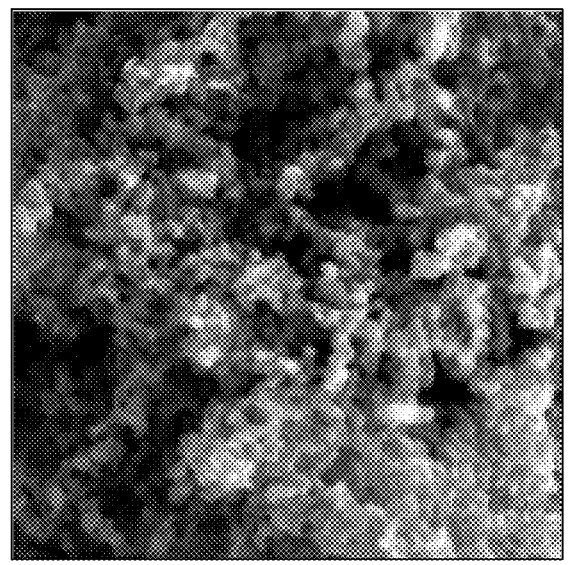
Figure 3D:
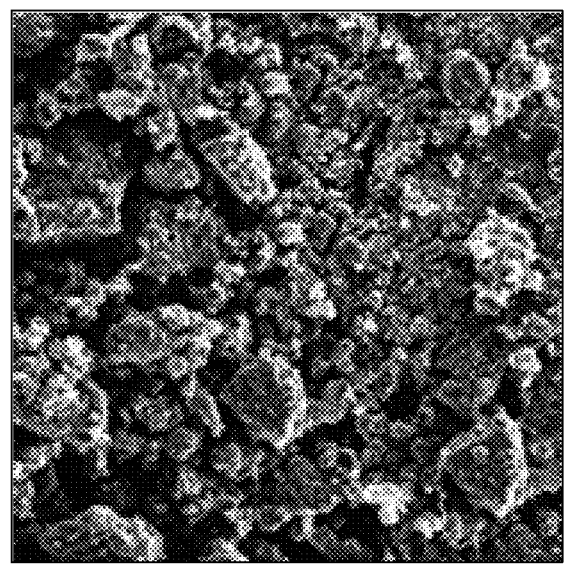

The morphology of the KB and the IKB samples, both before and after sulfur loading, was investigated by scanning electron microscopy (SEM). As shown in FIGS. 3A and 3B, the KB and S80/KB particles are very similar in morphology, showing irregular shapes and sub-micron sized structures having nanoparticles with spherical shape and uniform size distribution (FIG. 3C). When the KB or S/KB materials were used directly in a slurry to form electrodes, these loose sub-micron sized structures were easily separated into smaller structures due to dispersion by the solvent used in the slurry. The result was severe cracking of the electrode formed from the slurry with traditional KB or S/KB.

Figure 3E:
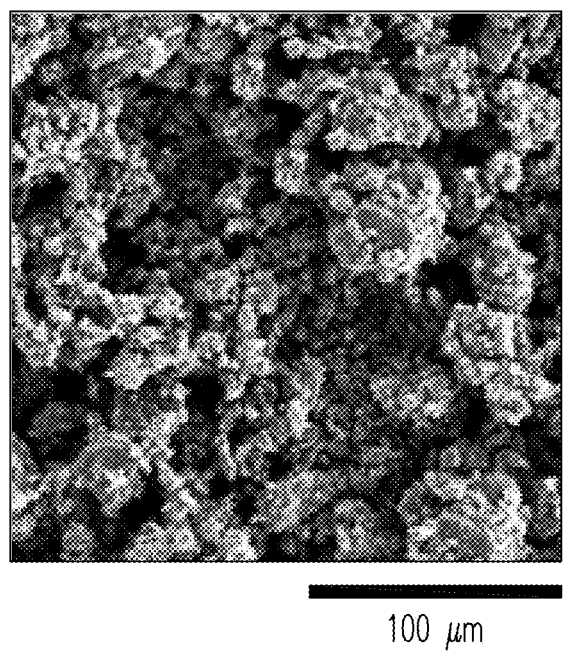
Figure 3F:
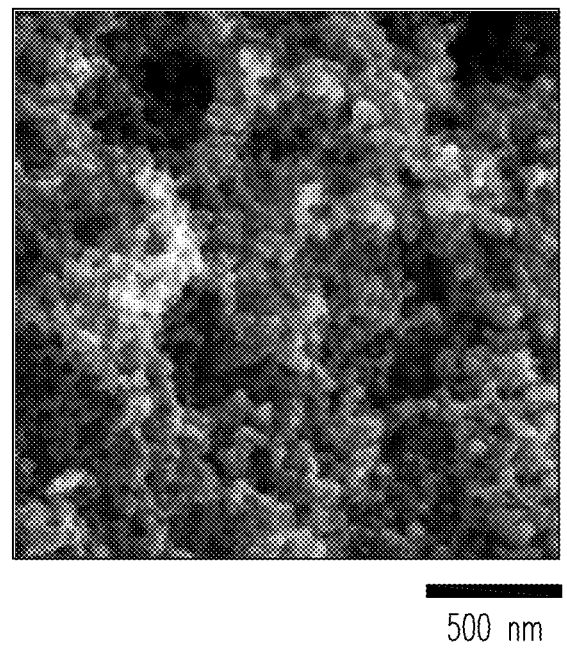

In contrast, when forming electrodes from materials and processes encompassed by embodiments of the present invention, in which nanoparticles form and aggregate into secondary particles, the electrodes lack the defects characteristic of traditional approaches. The secondary particles can be greater than or equal to one micrometer in average particle size. The aggregation can be attributed, at least in part, to interconnection from carbon frameworks formed during the heat treatment. Secondary particles were maintained after sulfur loading (FIG. 3E). On a higher magnification mode (FIG. 3F), it is found that the secondary particles comprise nanoparticles, which indicates that the aggregation process has little influence on nanostructures of the primary nanoparticles. Bound by carbon, the aggregated nanoparticles composing the secondary particles are stable against the solvent in a slurry used to form electrodes. There was no notable degradation of the secondary particles into smaller structures due to dispersion by the solvent as there was in the case of KB and S/KB slurries. As a result, fabrication of electrodes from the secondary particles are stable and can have high loadings of active material while lacking cracks and defects, which can be present in traditionally formed electrodes.

Electrodes and CR2325 coin-type cells were formed as described below for measurement of electrochemical properties of the S/IKB (or integrated Si)-containing electrodes with various mass loadings. Firstly, S80/IKB composites were mixed with carbon conductors, Carboxymethyl cellulose/Styrene Butadiene Rubber (CMC/SBR, 1:2 in weight) water based binder with a weight ratio of 80:10:10 by magnetic stir at a speed of 800 rpm for 12 h with water as a solvent and n-Butanol as an additive. Conductors comprising conductive carbon black (Super P®), graphene (G), and/or multiwall carbon nanotubes CNT were used in the present work. The obtained slurry was pressed onto carbon coated-aluminum foil (as a current collector) and thereafter dried under vacuum at 50° C. for 12 h to obtain a cathode.

The mass loading of the electrode ranged between 2-8 mg sulfur $cm^{-2}$. The electrodes were pressed at a pressure of 0.25 tons before use. The coin cells were assembled in a dry and inert atmosphere in a glove box containing the prepared cathodes, lithium anodes, and Celgard 2400 polypropylene separators. The electrolyte was 1 M lithium bis(trifluoromethanesulfonyl)imide (LiTFSI) dissolved in a mixture of 1,3-dioxolane (DOL) and dimethoxyethane (DME) (1:1 in volume) with 0.1M $LiNiO_3$ as an additive. The amount of liquid electrolyte was controlled by using a Finnpipette. The electrochemical performance was measured galvanostatically at various C rates (1 C=1000 mA $g^{-1}$) in a voltage range of 1.7-3 V on a battery tester at room temperature. The charge/discharge specific capacities were calculated on the mass of sulfur by excluding carbon content.

Large specific surface area and porous structures of the conductive carbon can be beneficial for utilization of insulating electroactive materials, such as sulfur, during the electrochemical reactions that occur in charging and discharging. Accordingly, surface area and pore volume embodiments of the present invention are preferably relatively high. For instance, the surface area can be at least 1000 $m^2 g^{-1}$. In another instance, the pore volume can be at least 3 $cm^3 g^{-1}$.

Measurements of surface area and pore volume of actual IKB samples before and after sulfur loading were evaluated by nitrogen sorption analysis. The $N_2$ absorption and desorption isotherm of IKB exhibit a high BET specific area of 1148 $m^2 g^{-1}$, and Barrett-Joyner-Halenda (BJH) pore size distribution indicates that majority pores are in the range of 20-30 nm (see FIG. 4A). The pore volume of an IKB sample was measured to be 3.08 $cm^3 g^{-1}$. These parameters are comparable to those of KB, and indicate again that the nanostructures of the primary KB particles are maintained even after the aggregation process into secondary particles. Accordingly, in some embodiments, the surface area and pore characteristics of the secondary particles is comparable to that of a material having directly bound nanoparticles.

Figure 4A:
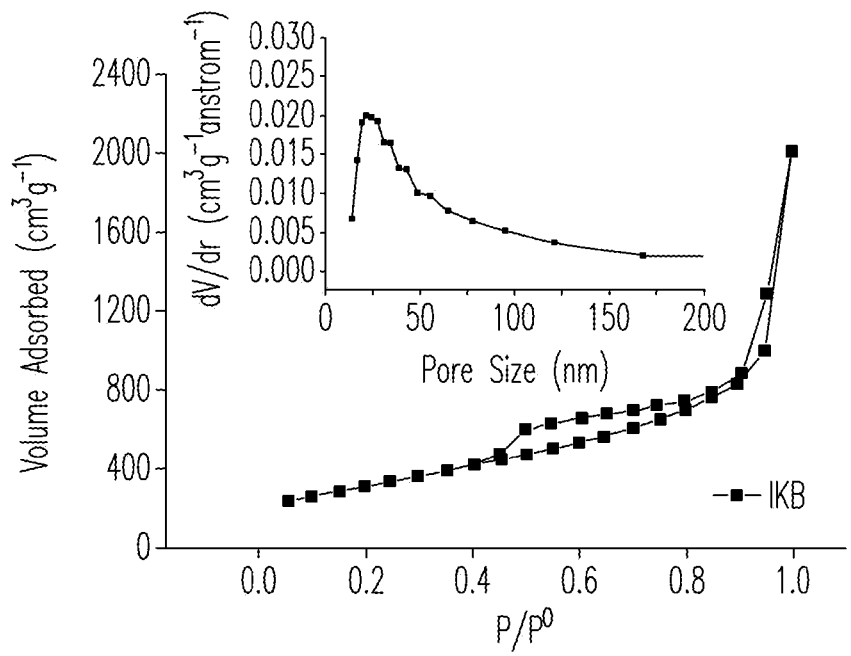
FIGS. 4A-4B contain nitrogen sorption isotherms of (A) IKB and (B) S80/IKB samples.
Figure 4B:
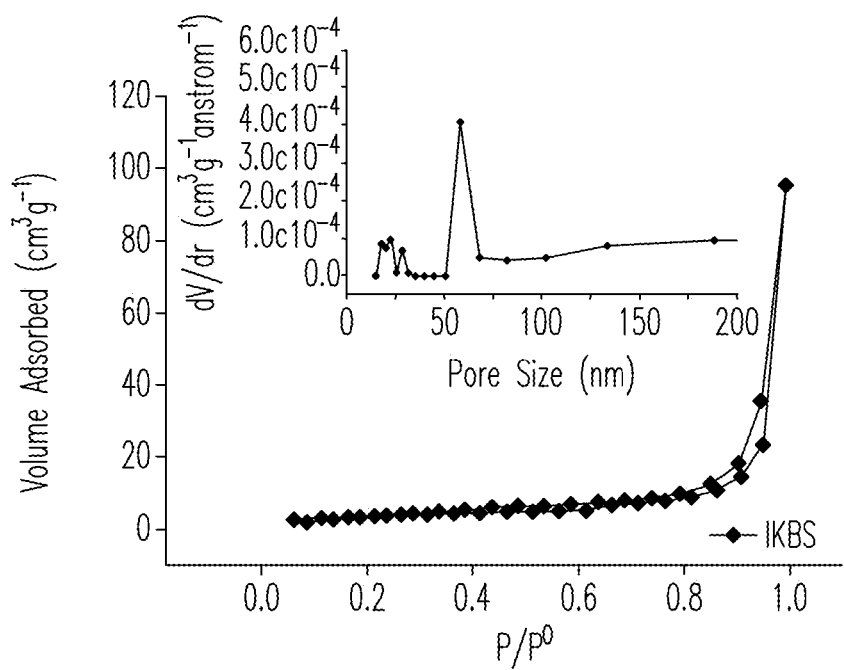
Figure 5:
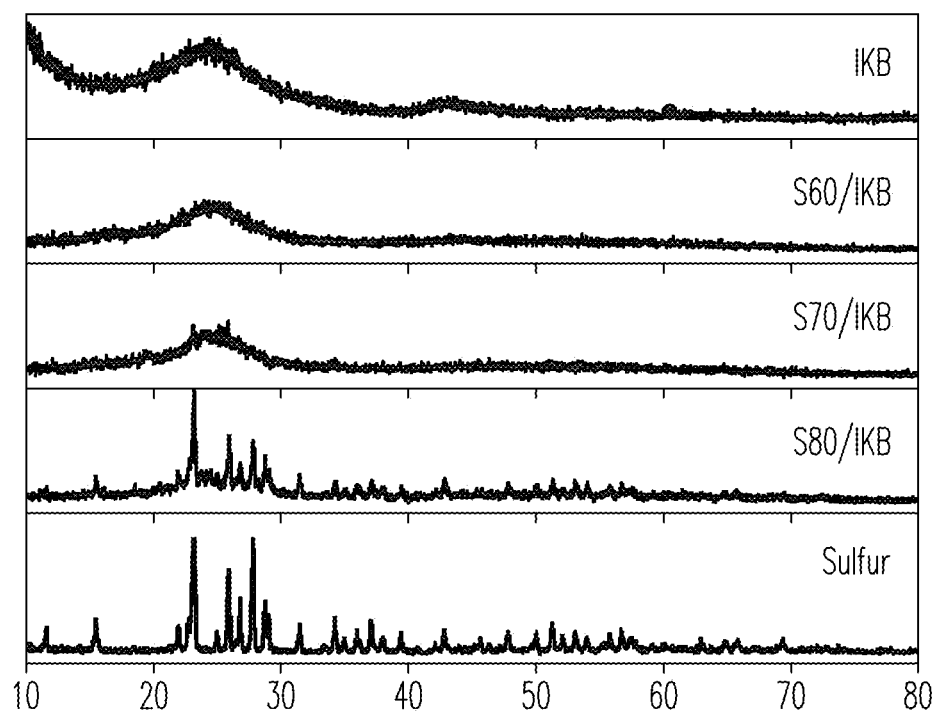
FIG. 5 contains XRD patterns of IKB, S60/IKB, S70/IKB, S80/IKB, and crystalline sulfur.

After sulfur loading (S80/IKB), the pores of IKB were filled with sulfur and the corresponding BET surface and pore volume values decreased to 12.4 $m^2 g^{-1}$ and 0.15 $cm^3 g^{-1}$, respectively (See FIG. 4B). This indicates that the pore sizes encompassed by embodiments of the present invention are suitable to hold high content values of electroactive materials, such as sulfur. The result is further supported by XRD characterization of S/IKB with various sulfur contents. As shown in FIG. 5, the IKB shows characteristics of nano-size carbon materials (i.e., broad and low intensity diffraction peaks at 2θ values of approximately 25°. At sulfur loadings of 60 and 70 wt %, the diffraction patterns of S60/IKB and S70/IKB are similar to that of IKB, demonstrating that the sulfur was amorphous and likely confined inside the pores of IKB; the sulfur was not crystalline. When the sulfur loading was further increased to 80 wt %, the diffraction pattern indicated the presence of some crystalline sulfur. Accordingly, in some embodiments, the electroactive material loading in IKB is less than or equal to 80%.

Figure 6A:
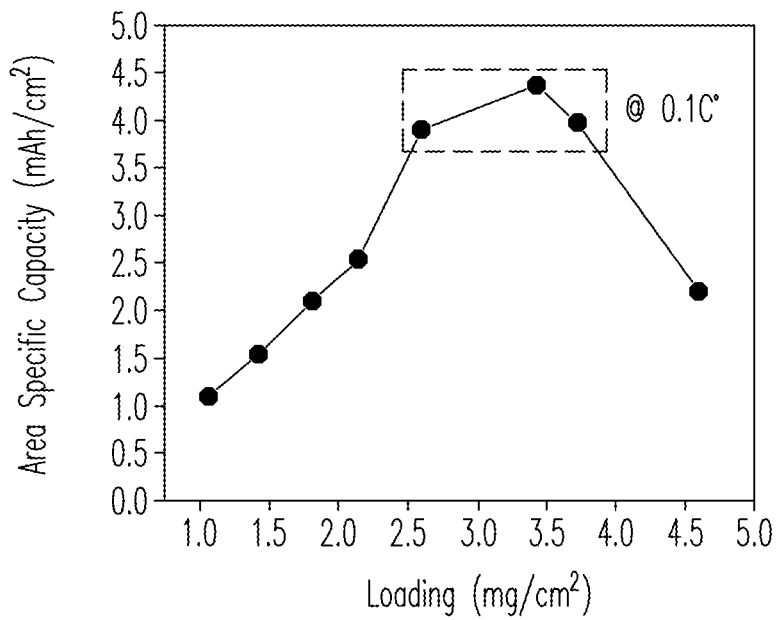
FIGS. 6A-6B contain graphs of (A) area specific capacity as a function of sulfur loading obtained at 0.1 C for an electrode having S80/IKB and (B) cycling stability for the electrode at 0.1 C.

High energy density in energy storage devices such as batteries depend at least in part on the areal mass loading of electroactive material in electrodes. As one example of embodiments of the present invention, the relationship between area specific capacity and sulfur loading in IKB was investigated. Referring to FIG. 6A, for an electrode comprising S80/IKBS, conductive carbon black (e.g., Super P®), and binder at a weight ratio of 80:10:10, respectively, the area specific capacity was measured as a function of sulfur loading. The area specific capacity gradually increases and then quickly decays as the sulfur loading increases. The amount of sulfur utilized should preferably be balanced relative to the mass loading. In the instant example, mass loadings between the range of 2.5-4 mg sulfur $cm^{-2}$ showed the best performance. However, embodiments of the present invention should not be limited to such mass loadings since different electroactive materials and/or nanoparticles can result in different ranges of mass loadings and/or since sub-optimal performance can be acceptable in some situations.

Figure 6B:
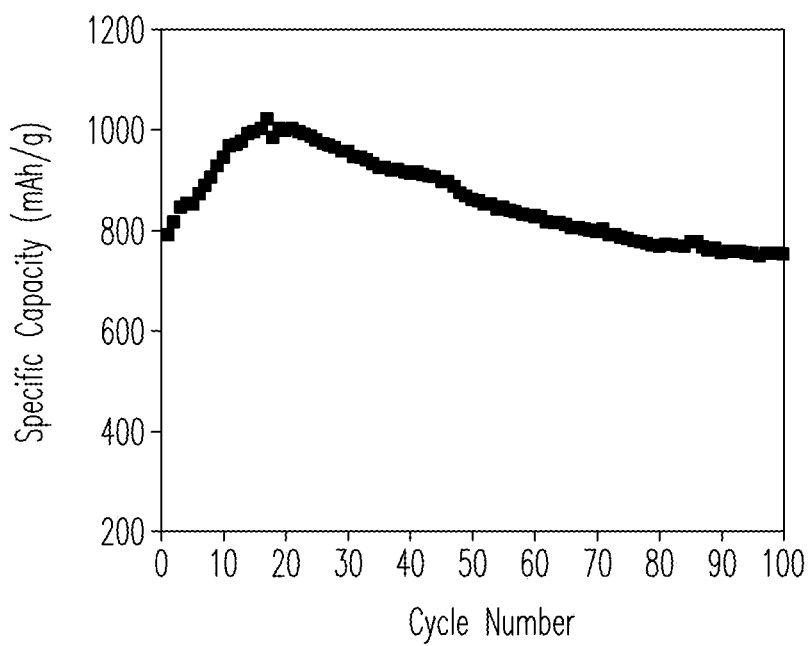

For consistency, the following examples describe electrodes having sulfur loadings around 3-3.5 mg sulfur $cm^{-2}$. As shown in FIG. 6B, when cycled at 0.1 C, the S80/IKB delivers a capacity of 750 $mAhg^{-1}$ even after 100 cycles. In some embodiments, the carbon framework of the secondary particles comprising nanoparticles can suppress the diffusion of polysulfide and enhance its reversible transformation.

Figure 7:
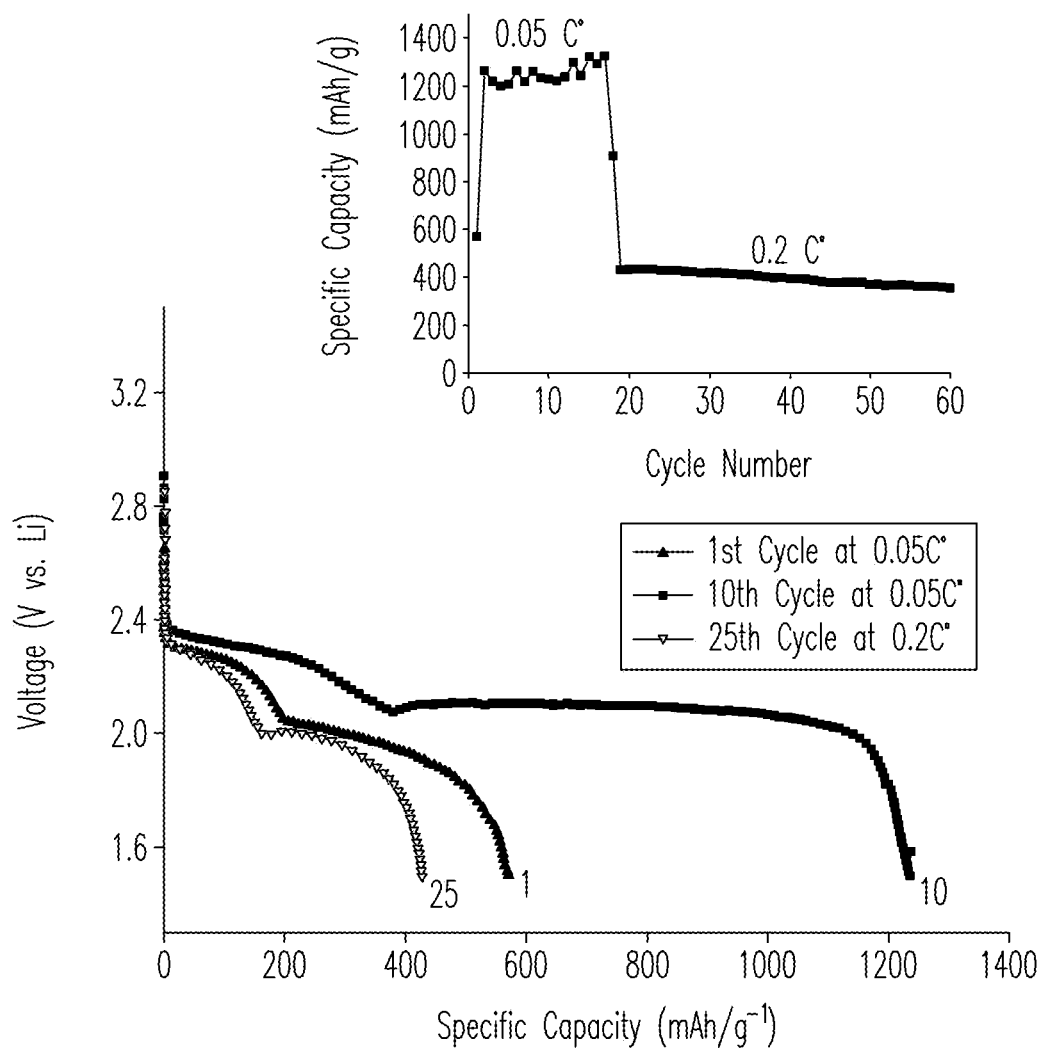
FIG. 7 contains discharge profiles of an electrode having S80/IKB: 1st and 10th discharge curves at 0.05 C and 25th discharge curves at 0.2 C. The insert contains the cycling performance at both 0.05 and 0.2 C.

A gradual increase in capacity can be observed in the first 15 cycles, which can be attributed to slow electrolyte penetration into the thick electrode. This phenomena was more pronounced for electrodes with increased loading or for electrodes cycled at high current densities. For example, FIG. 7 shows the discharge profiles and cycling performance of a thick electrode (5 mg sulfur/$cm^{-2}$) at 0.05 and 0.2 C rates. At a discharge rate of 0.05 C, a low capacity of 570 $mAhg^{-1}$ was obtained in the first discharge with obvious polarization of decreased discharge plateau. Slow electrolyte penetration is observable during the first cycles; subsequent discharge capacities increase significantly to more than 1200 $mAhg^{-1}$ and the cell runs stably upon cycling. However, when the current density was increased to 0.2 C, much decreased discharge capacities and voltage plateaus were observed again. These results indicate that high electronic conductivity is preferred for thick electrodes, since contact resistance may rise along with the increase of electrode thickness.

Figure 8A:
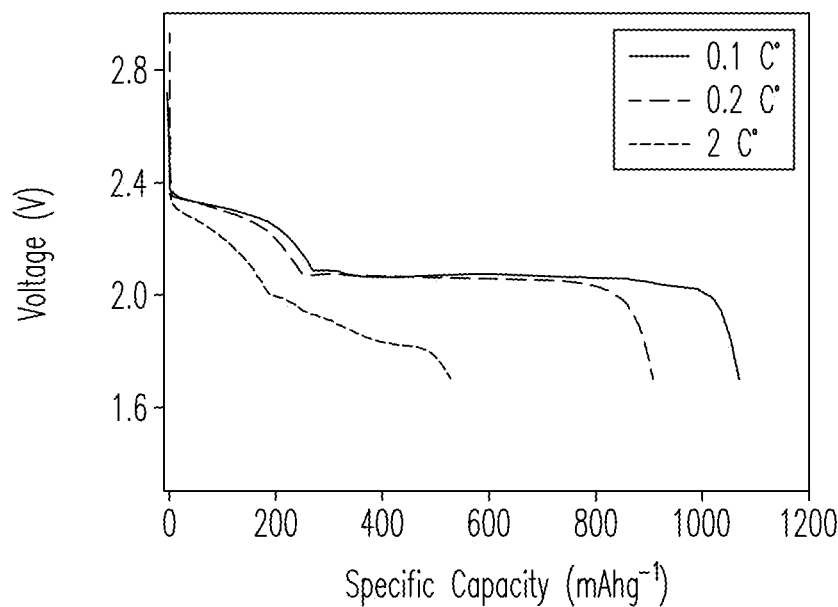
FIGS. 8A-8B contain (A) discharge curves of S80/IKB electrode having CNT and G as conductors at 0.1, 0.2, and 2 C; (B) Cycling performance of the electrode with two formation cycles at 0.05 C and subsequent cycles at 0.2 C.
Figure 8B:
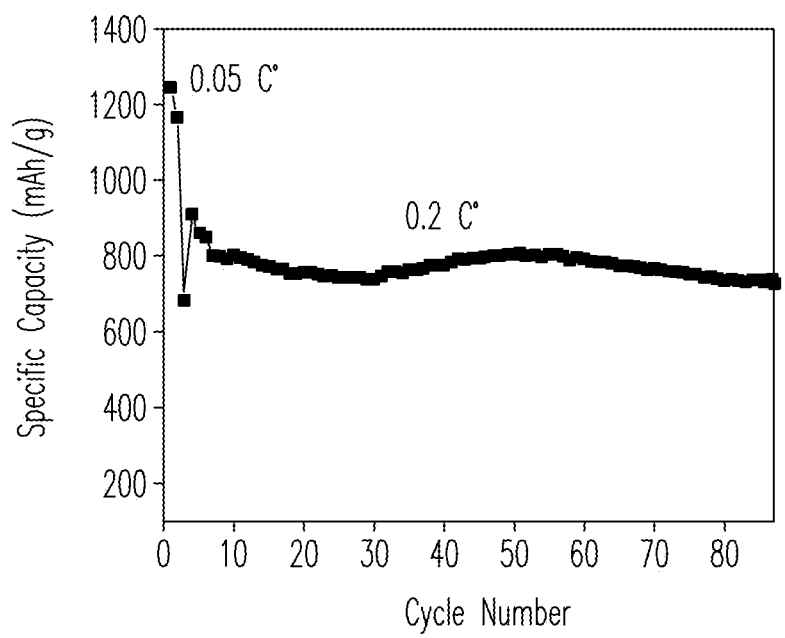

In some embodiments, in order to mitigate the problems of slow electrolyte penetration and/or low electronic conductivity of thick electrode, multiwall carbon nanotubes (CNT) and/or graphene (G) (5-10% for each) can be introduced when making a slurry. These conductors can interconnect or wrap S80/IKB particles to further enhance the electronic conductivity and electrolyte penetration due to their one-dimensional structure, large specific surface area and high conductivity. In one example, the electrode comprises 80 wt % S80/IKB, 5 wt % G, 5 wt % CNT and 10 wt. % binder and the electrochemical performance improves relative to electrodes using conductive carbon black. Referring FIG. 8A, the discharge capacities at 0.1 C and 0.2 C rates are around 1100 and 900 $mAhg^{-1}$, respectively. Even cycled at 2 C rate, a discharge capacity of 550 $mAhg^{-1}$ could be obtained, which is higher compared to the 0.2 C discharge capacity of electrode without G and CNT (FIG. 2). FIG. 8B exhibits the cycling stability of the electrode with CNT and G as conductors, which was first cycled at 0.05 C for two formation cycles and then at 0.2 C for subsequent cycles. High capacities around 1200 $mAhg^{-1}$ were achieved for early cycles at a low rate of 0.05 C without a big capacity gap between the first and second cycle, which is different to the performance of electrodes without CNT and G conductors (FIG. 7, inset). Accordingly, electrolyte penetration in thick electrodes was much improved with the presence of G and CNT. When the current was switched to 0.2 C, the discharge capacity decreased to 900 $mAhg^{-1}$ through a very short activation process and was then maintained well through cycling. Stable capacities above 700 $mAhg^{-1}$ were achieved over 80 cycles, which is comparable to the 0.1 C discharge capacity of electrodes without CNT and G conductors (FIG. 4b).

Figure 9A:
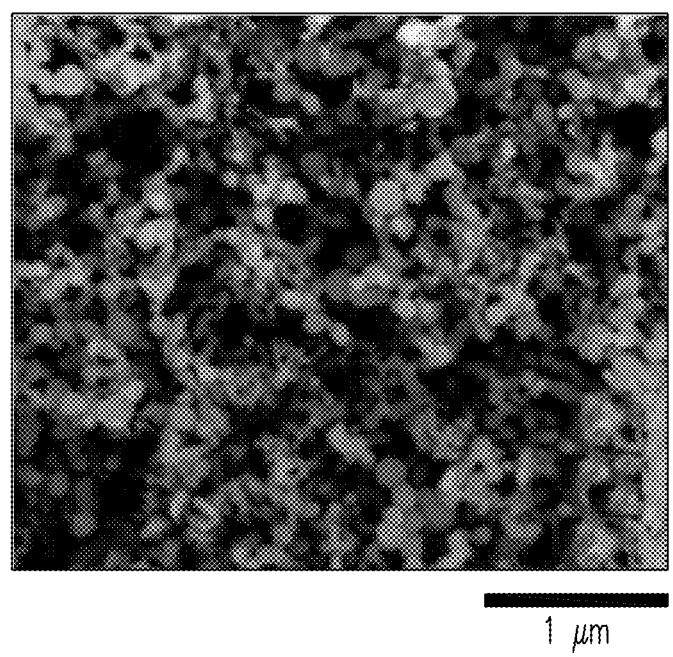
FIG. 9 contains SEM micrographs of (A) Si nanoparticles, (B) secondary particles comprising Si nanoparticles aggregated with carbon, (C) magnification of FIG. 9B, and (D) XRD patterns of Si nanoparticles compared to secondary particles comprising aggregated Si nanoparticles and CMC/SBR as a binder.
Figure 9B:
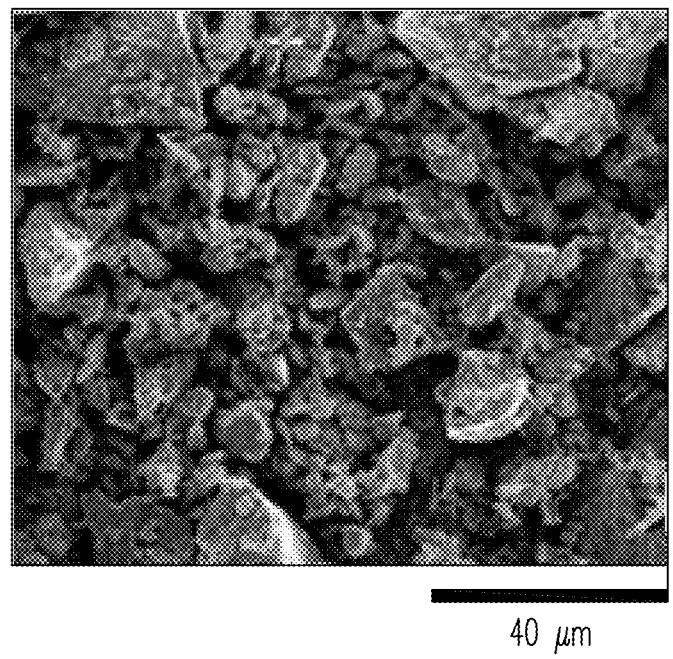
Figure 9C:
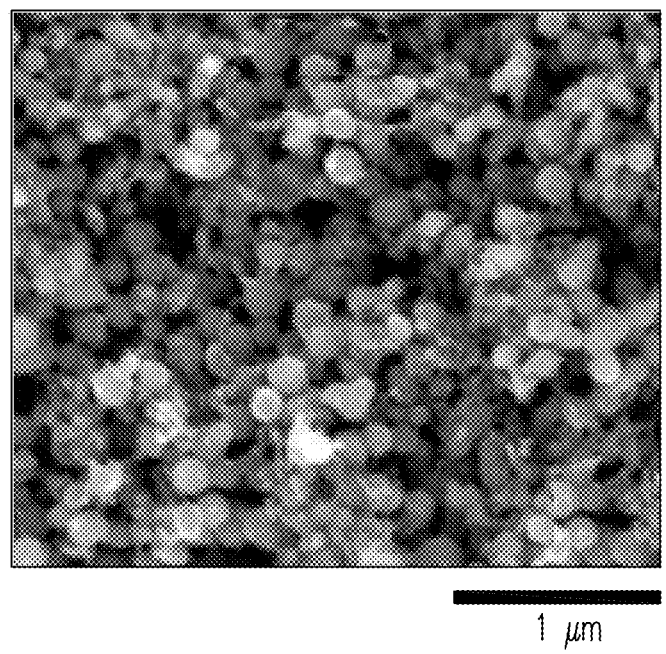
Figure 9D:
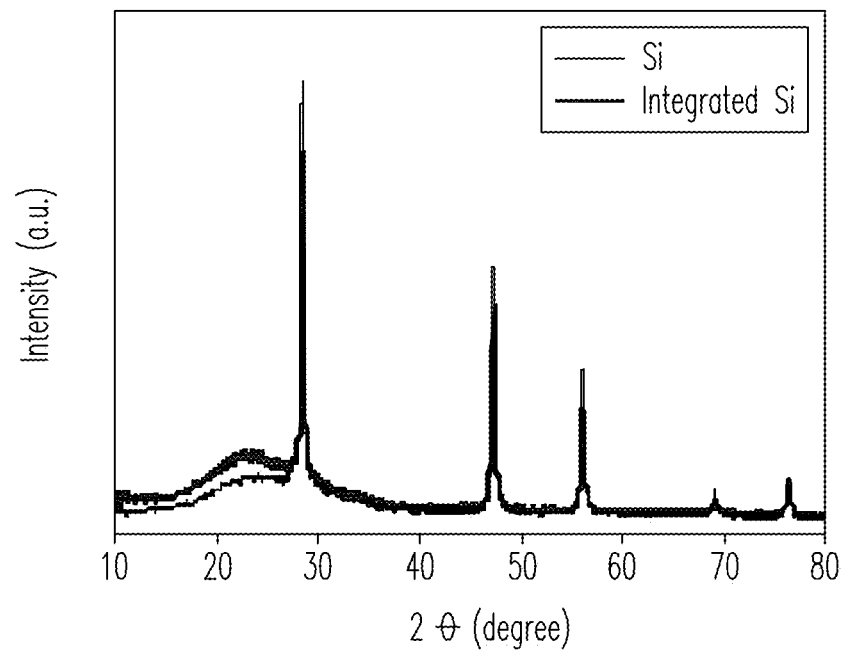

Embodiments of the present invention are not limited to Ketjen black. For example, Si nanoparticles can be successfully aggregated into secondary particles for high-loading electrode according to methods described herein for IKB. Si nanoparticles (See FIG. 9A) having a typical particle size of 50-100 nm were aggregated into secondary particles (See FIG. 9B) having particle sizes ranging from 1 micron to tens of microns without any change in phase structure according to embodiments of the present invention. The absence of phase structure changes is supported by XRD patterns shown in FIG. 9D. Similar to IKB, the secondary particles comprise primary nanosized Si particles interconnected by carbon frameworks (FIG. 9C). Using the secondary particles comprising aggregated Si nanoparticles, thick and crack-free electrodes with loadings of above 2 mg Si cm$^{-2}$ were obtained through slurry coating technique with CMC and SBR as binder. The methods for making the electrodes using the aggregated Si nanoparticles in the examples above were analogous to those using IKB.

While a number of embodiments of the present invention have been shown and described, it will be apparent to those skilled in the art that many changes and modifications may be made without departing from the invention in its broader aspects. The appended claims, therefore, are intended to cover all such changes and modifications as they fall within the true spirit and scope of the invention.

We claim:

1. A thick electrode having nanoparticles comprising an electroactive material, the electrode characterized by secondary particles bound together by a binder, each secondary particle comprising an aggregate of the nanoparticles, wherein the nanoparticles are coated and joined together in each aggregate by conductive carbon and wherein the electrode has a loading of the electroactive material in an amount ranging from about 2 mg/cm$^2$ to about 8 mg/cm$^2$.

2. The thick electrode of claim 1, wherein the electroactive material comprises sulfur.

3. The thick electrode of claim 1, wherein the nanoparticles comprise at least one electroactive material selected from the group consisting of phosphates, sulfides, sulfates, transition metal oxides and combinations thereof.

4. The thick electrode of claim 1, wherein the nanoparticles comprise carbon.

5. The thick electrode of claim 1, wherein the nanoparticles comprise silicon.

6. The thick electrode of claim 1, wherein the electroactive material has a loading in the thick electrode in an amount ranging from about 5 mg/cm$^2$ to about 8 mg/cm$^2$.

7. The thick electrode of claim 1, wherein the thick electrode has a thickness greater than 60 micrometers.

8. The thick electrode of claim 7, having substantially no cracks or pinholes.

9. The thick electrode of claim 1, wherein the binder comprises carboxymethyl cellulose (CMC), polyvinylidene fluoride (PVDF), styrene butadiene rubber (SBR), or combinations thereof.

10. The thick electrode of claim 1, wherein the secondary particles have an average size greater than or equal to 1 micrometer.

11. The thick electrode of claim 1, further comprising a metallic foil current collector on which the electrode is formed.

12. A thick electrode having nanoparticles comprising an electroactive material, the electrode characterized by secondary particles bound together by a binder, each secondary particle comprising an aggregate of the nanoparticles, wherein the nanoparticles are coated and joined together in each aggregate by conductive carbon, wherein the thick electrode has a loading of electroactive material greater than 3 mg/cm$^2$, wherein the electroactive material comprises sulfur, and wherein the sulfur has a loading in the secondary particles greater than 75 wt % of the total weight.

13. A thick electrode having nanoparticles comprising an electroactive material, the electrode characterized by a metallic foil current collector on which the electrode is formed and by secondary particles having an average size greater than 1 micrometer and being connected together by a binder, each secondary particle comprising an aggregate of the nanoparticles, wherein the nanoparticles are coated and joined together in each aggregate by conductive carbon and wherein the electroactive material has a loading in an amount ranging from about 4 mg/cm$^2$ to about 8 mg/cm$^2$.

14. The thick electrode of claim 13, wherein the electroactive material comprises sulfur.

15. The thick electrode of claim 13, further comprising a conductor selected from carbon nanotubes, graphene, or combinations thereof.

16. A thick electrode having nanoparticles comprising an electroactive material, the electrode characterized by a metallic foil current collector on which the electrode is formed and by secondary particles having an average size greater than 1 micrometer and being connected together by a binder, each secondary particle comprising an aggregate of the nanoparticles, wherein the nanoparticles are coated and joined together in each aggregate by conductive carbon, wherein the electroactive material has a loading greater than 4 mg/cm$^2$, wherein the electroactive material comprises sulfur, and wherein the sulfur has a loading in the thick electrode greater than 75 wt %.

17. A method for fabricating a thick electrode having nanoparticles comprising an electroactive material, the method comprising:

Dispersing the nanoparticles in a volume of water to yield a dispersion;

Adding at least one carboxyl-group-containing organic precursor to the dispersion to yield a mixture;

Stirring and heating the mixture to a first temperature for a first amount of time;

Adding ethylene glycol, long chain polyethylene glycol, or both to the mixture;

Heating for a second amount of time, thereby initiating an esterification reaction between the carboxylic acid and the ethylene glycol and/or polyethylene glycol to yield an esterification product;

Evaporating the water;

Heating to a second temperature and converting the esterification product into an conductive carbon, thereby forming secondary particles comprising the nanoparticles coated and joined together by the conductive carbon.

18. The method of claim 17, wherein the nanoparticles comprise carbon.

19. The method of claim 17, wherein the nanoparticles comprise silicon.

20. The method of claim 17 wherein the nanoparticles comprise at least one compound selected from the group consisting of LiFePO$_4$, LiMnPO$_4$, V$_2$O$_5$, and combinations thereof.

21. The method of claim 17, wherein the electroactive material comprises sulfur.

22. The method of claim 21, further comprising embedding sulfur in the secondary particles, in between the secondary particles, or both.

23. The method of claim 22, further comprising embedding sulfur to a sulfur loading greater than 5 mg/cm$^2$.

24. The method of claim 17, wherein the electrode has a loading of electroactive material greater than or equal to 3 mg/cm$^2$.

25. The method of claim 17, wherein the carboxyl-group-containing organic precursor comprises citric acid.

26. The method of claim 17, wherein the mole ratio of carboxyl-group-containing organic precursor to ethylene glycol or polyethylene glycol is approximately 1:2.

27. The method of claim 17, wherein the secondary particles have a particle size greater than or equal to 1 micrometer.

28. The method of claim 17, further comprising adding a binder to the secondary particles to yield a slurry and casting the slurry on a substrate or in a form.

29. The method of claim 28, wherein the binder is selected from the group consisting of CMC, PVDF, SBR, and combinations thereof.

30. The method of claim 28, wherein the substrate comprises a metallic foil or mesh current collector.

* * * * *